United States Patent [19]

Walker et al.

[11] Patent Number: 4,530,522

[45] Date of Patent: Jul. 23, 1985

[54] RELEASABLE CONNECTOR FOR CONDUIT COMPONENTS

[75] Inventors: Kenneth L. Walker, Clinton; Kenneth A. Farnstrom, Oak Ridge, both of Tenn.

[73] Assignee: Remote Technology Corp., Oak Ridge, Tenn.

[21] Appl. No.: 529,582

[22] Filed: Sep. 6, 1983

[51] Int. Cl.³ .............................................. F16L 35/00
[52] U.S. Cl. ..................................... 285/91; 285/368; 285/420
[58] Field of Search ............... 285/420, 364, 406, 414, 285/415, 368, 412, 90, 91, 320

[56] References Cited

U.S. PATENT DOCUMENTS

| | | | |
|---|---|---|---|
| 329,547 | 11/1885 | Goodrich | 285/90 X |
| 421,657 | 2/1890 | Bowers | 285/90 X |
| 2,649,314 | 8/1953 | Richardson | 285/420 X |
| 4,198,076 | 4/1980 | Mezei | 285/18 |
| 4,215,880 | 8/1980 | Trittipoe | 285/368 X |

*Primary Examiner*—Cornelius J. Husar
*Assistant Examiner*—Eric S. Katz

*Attorney, Agent, or Firm*—Pitts and Brittian

[57] ABSTRACT

A device for effecting a link pipe seal between aligned portions of conduit. This device has a body portion (22) which may be affixed to any given structure and one portion of the tubing or piping (14) to be joined is clamped therein. The body provides for axial alignment of a second piece of tubing or piping (12) and carries a swing clamp (34) for engaging the second piece of tubing or piping whereby the second piece is moved axially toward the first piece to effect the seal. The motion of the swing clamp is accomplished by a left-handed threaded bolt (42), threadably engaged with the swing clamp and carried by the body as the pivot element for the swing clamp. Frictional engagement between the swing clamp and the threaded bolt brings about movement of the swing clamp between first and further preselected rotational positions as the bolt is rotated. Upon obtaining one of the preselected positions, the swing clamp is moved axially with respect to the second piece of tubing or piping by further rotation of the bolt. A replaceable sealing element (66) is carried by one of the pieces of piping or tubing so that the joint may be reused if necessary or desirable.

8 Claims, 4 Drawing Figures

RELEASABLE CONNECTOR FOR CONDUIT COMPONENTS

DESCRIPTION

1. Technical Field

This invention relates generally to mechanical devices for releasably joining abutting ends of conduit, such as tubing, piping, etc. More particularly, it is an improved "swing clamp" type of connector for the releasable joining of such conduits in confined spaces and/or where hazardous conditions exist.

2. Background Art

Chemical plants, for example, utilize large numbers of process vessels, valves, etc., all interconnected by a myriad of conduits (pipes and tubing). Frequently it is desirable to include couplings in the lengths of conduits to permit removal of components from the system. These couplings must be such that they will prevent the escape of the contents of the conduits under all conditions of operation. However, they must also permit ready release of the conduit portions. Often the couplings are located in closely confined spaces so that the mechanism for operation of the couplings must utilize a minimum of motion. Furthermore, the equipment may contain hazardous materials so that remote operation of the coupling may be a necessity. This is particularly true in the nuclear industry where the contents of the equipment are chemically hazardous as well as radioactive.

A considerable number of coupling devices are known that have been developed for specific applications. For example, in U.S. Pat. No. 991,891, issued to F. Robinson on May 9, 1911, a cylindrical sleeve surrounds the juncture of two pieces of pipe with gaskets at each end thereof. A cam-like mechanisn draws the gaskets into sealing position against the ends of the sleeve and the exterior surfaces of the pipes.

A coupling described in U.S. Pat. No. 1,865,462, issued to G. M. Etryre on July 5, 1932, is specifically for joining pipe pieces carrying viscous fluids such as asphalt. The male and female portions (respectively joined to abutting ends of pipe) carry mating conical surfaces. One of the coupling members (female) carries a pair of radially extending studs, and hook members carried by the other member (male) engage the studs, and a lever mechanism operates the hooks to draw the units into tight registry.

In U.S. Pat. No. 3,290,060, issued Dec. 6, 1966, to J. A. Haeber, a coupling is described which is power operated for remote operation. Appropriate sealing sleeves and gaskets are engaged through the use of a rack and pinion gear mechanism. A prime mover of a suitable form is used to rotate the pinion gear and thereby close or open the coupling.

Remote operation is a characteristic of the coupling described in U.S. Pat. No. 3,260,270 issued July 12, 1966, to B. J. Watkins, et al. Each pipe piece has a flange with a conical rear surface. A split collar is placed about these flanges, the collar having internal surfaces that mate with the conical surfaces. A bolt, driven by any suitable operator, opens or closes the split ring to release or engage, respectively, the flanges of the pipe pieces.

Another coupling is described in U.S. Pat. No. 3,615,107, issued Oct. 26, 1971, to A. L. Paddington. This is for a pair of aligned flanged pipe units. Several arms are pivoted on a support member arranged in screw-thread engagement with one pipe piece behind the respective flange. The opposite ends of the arms are provided with a latch to engage behind the other flange for effecting coupling of the pipe pieces.

Another coupling utilizing latch members which engage the rear surface of a flange is described in U.S. Pat. No. 4,198,076 issued Apr. 15, 1980, to G. A. Mezei. A plurality of these latching members are spaced about the coupling, with each having a clamp arm that rotates about the axis of an operating bolt for that clamp arm. Axially aligned with each bolt are springs to produce appropriate friction to prevent undesirable rotation of the clamp arm when disengaged, and to cause the clamp arm to rotate into or out of engagement with the flange shoulder.

Numerous coupling devices have been developed for the nuclear industry, particularly for tubing/piping used in chemical plants for the processing of fuel elements after their use in nuclear reactors. One such coupling has certain features found in the present invention and therefore is appropriately described. It is shown in a document identified as Report ORNL-TM-1097 issued by Union Carbide Corporation, Nuclear Division on or about May 1965. This coupling was developed for effecting a seal between mating conical surfaces in the adapters or ferrules attached to ends of the conduits to be joined. The unit, known as a TRU (Transuranium) disconnect, held one ferrule in a body portion. Pivotally mounted by a rotatable bolt to this body was a generally C-shaped swing clamp. This clamp, in operating position, engaged the rear surface of a flange on the second conduit ferrule. The pivot bolt was threaded in the body whereby rotation of the bolt caused the clamp to be moved axially toward the body and thereby force the mating surfaces of the ferules into sealing engagement. A torsion spring surrounding the bolt rotated the swing clamp away from the conduit when the bolt was sufficiently loosened to permit axial separation of the respective ferrules. A cam surface was provided to return the swing clamp to an engaging position. Corrosion on the bolt threads or the spring, or failure of the spring, resulted in an inoperable connector until the damaged components were replaced. Furthermore, whenever one of the mating surfaces of the ferrules became damaged—physically or chemically—the ferrules had to be replaced.

Accordingly, it is one object of the present invention to provide a coupling for aligned conduits that involves only one handed operation. It is another object to provide a coupling or connector that may be operated in confined space. It is a further object to provide a coupling wherein the sealing surfaces are readily replaced. Other objects will become apparent upon a consideration of the description and drawings hereinafter set forth.

DISCLOSURE OF THE INVENTION

In accordance with the present invention, a coupling device is provided to bring into sealing engagement opposed and aligned ends of a divided conduit, each end being provided with a flange. One of the flanges is releasably held in a body portion of the coupling device. A swing clamp, pivotally supported from the body, is moved radially into and out of engagement with the second flange by frictional engagement of a threaded bolt threadably received in the swing clamp, with the bolt serving as the pivot for the swing clamp. Further, the swing clamp is moved axially by rotation of the bolt, which axial movement causes engagement or disengagement of sealing surfaces of the conduit components. A replaceable seal element is held between the sealing surfaces.

BEST MODE FOR CARRYING OUT THE INVENTION

Figure 1:
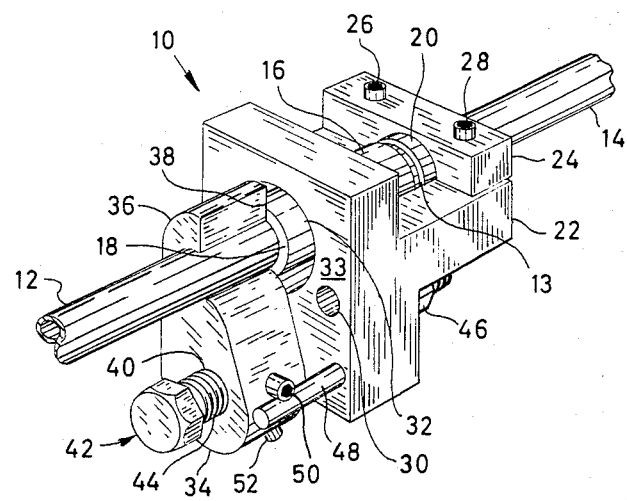
FIG. 1 is an isometric drawing of a coupling device according to the present invention.

Referring now to FIG. 1, shown therein is an isometric view of a coupling unit constructed according to the present invention. The coupling unit, shown generally at 10 therein, is provided for joining one piece of tubing or piping 12 to a second piece of tubing or piping 14 so that a juncture is formed at 13 therebetween. The tubing 12 is provided with a ferrule 16 in the form of a flange having a rear planar face 18. The second piece of tubing 14 is similarly provided with a ferrule form of a flange 20. This flange 20 is releasably secured in a recess (see FIG. 2) in a body unit 22 as with a clamping bar 24 and a pair of fasteners 26, 28. The body 22 can be provided with a plurality of openings 30 for accepting fasteners (not shown) to attach the body 22 to stationary support members such as a pipe rack.

The aforementioned ferrule 16 is received through bore 32 in the body 22, such that the flange surface 18 projects outwardly from an end wall 33 of the body 22. A swing clamp 34, having an outward C-shaped extention 36, is pivotally mounted above the surface 33. The C-shaped end portion has a planar edge 38 which bears against the aforementioned planar surface 18 of the ferrule 16. The swing clamp 34 is provided with a threaded bore 40 to accept a bolt 42 having left-handed threads 44. This bolt 42 has a reduced diameter portion, with a shoulder defining the transition (see FIGS. 2 and 3) which passes through an unthreaded bore (see FIG. 2) in the body 22, and a threaded nut 46 is affixed at the end thereof. Through this construction, the bolt 42 serves as the pivot for the swing clamp 34 as it moves in a plane perpendicular to the axis of the tubes 12,14. Projecting from the face 33 of the body member 22 is a substantially perpendicular stud 48. This stud engages one or the other of limiting pins 50,52 carried by the swing clamp 34. These limiting pins set the extreme rotational movement of the swing clamp so that proper alignment with tube 12 and its ferrule 16 is readily accomplished. For example, pin 50 is set at a position such that the extension 36 of the swing clamp 34 is substantially engaged with the surface of the tube 12 and thereby the surfaces 38 and 18 are properly mated. Furthermore, the limiting pin 52 prevents excessive rotation of the swing clamp 34 away from the tube 12.

Figure 2:
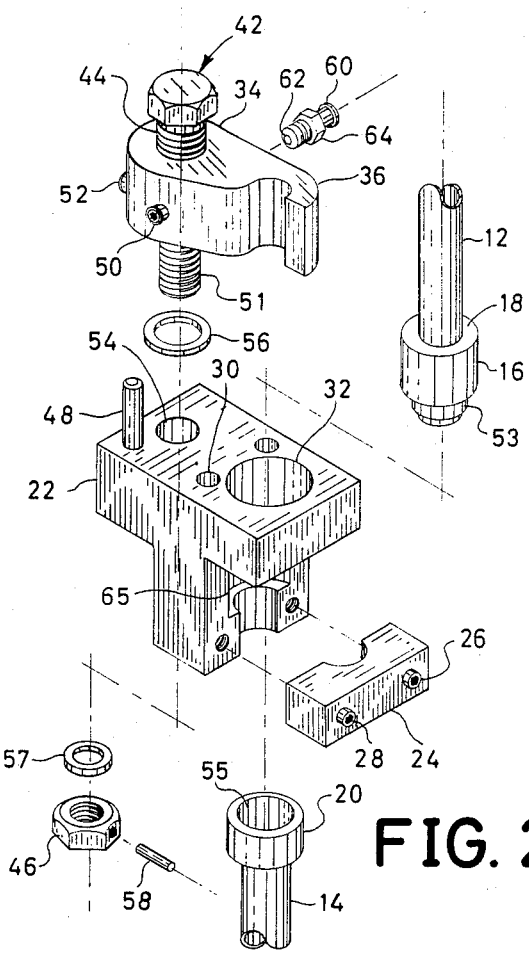
FIG. 2 is an isometric exploded view of the coupling device of FIG. 1.

These same components of the present invention, together with other necessary components thereof, are illustrated in the exploded view of FIG. 2. It may be seen, for example, that the ferrule 16 is provided with an extension 53 of reduced diameter, which extension is closely received in a receptacle 55 formed in the end of the ferrule 20 of the other piece of tubing. Furthermore, it may be seen that a threaded reduced diameter portion 51 of the bolt 42 passes through a bore 54 in the body 22 and thrust washers 56 and 57 are placed on opposite surfaces of the body member prior to the application of the nut 46. A pin 58 is utilized to prevent the loss of the nut 46 from the bolt 42.

A further feature of the present invention is in the form of a friction setting screw 60 which is threadably received in an opening (not shown) in the swing clamp 34 which opening is aligned substantially perpendicularly with the axis of the bolt 42. This threaded member 60, having an end 62 to bear against the aforementioned threads 44 of the bolt 42, provides for frictional engagement therebetween so that the bolt 42 is restrained against ease of rotation. A nut 64 carried by the threaded element 60 is provided to lock the threaded element 60 at any level of insertion within its threaded opening in the swing clamp 34. Thus, once a given degree of friction is achieved, it can be locked for that constant amount of friction. Also shown in FIG. 2 is a recess 65 to accept all or a portion of ferrule 20.

Figure 3:
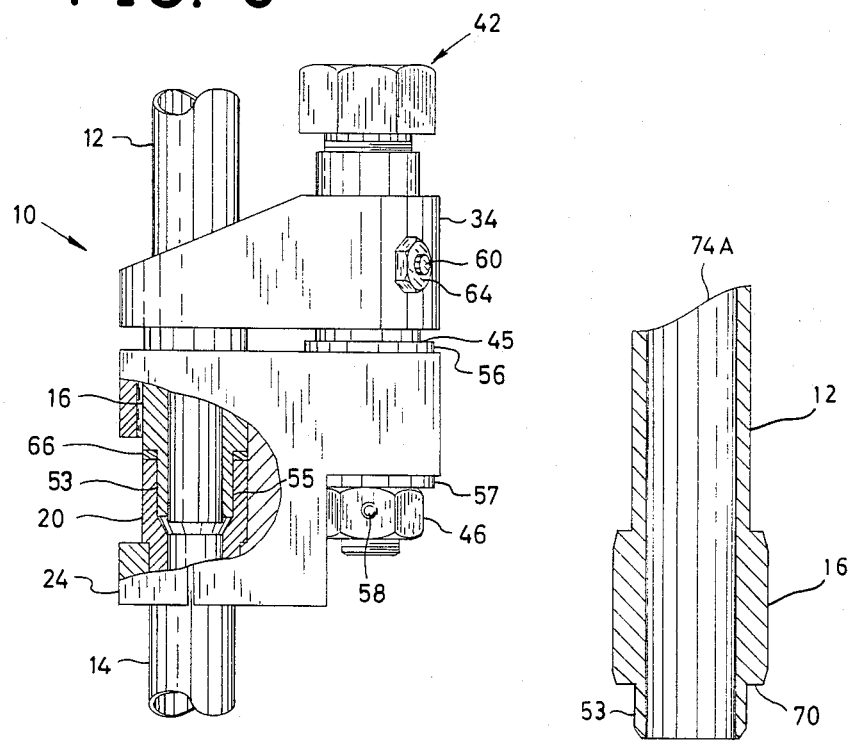
FIG. 3 is a side view, partially cut away, of the coupling device of FIG. 1.

A side view of the present invention is shown in FIG. 3 with a portion cut away so that the sealing means of the invention is illustrated. It may be seen in this view how the extension 53 of the ferrule 16 fits within the recess 55 of the ferrule 20 to effect an adequate seal between the portions of the tubing. A sealing member 66 is placed about the extension 53 such that the end surface of the ferrule 20 causes compression thereof against the ferrule 16. This sealing element may be metallic or may be an elastomer depending upon the particular usage of the system. A metal sealing element (e.g., a K-seal) is necessary for high temperature operation in contrast to a chemically inert elastomer when excessive temperatures are not present. Also, anelastomer-type element can be inserted within a metal sealing element for functional engagement with the extension 53 to hold the metal seal in place during assembly of the ferrules. Also shown in this FIG. 3 is a shoulder 45 defining the transition between threads 44 of one diameter and threads 51 of the smaller diameter. This shoulder abuts against thrust washer 56.

Figure 4:
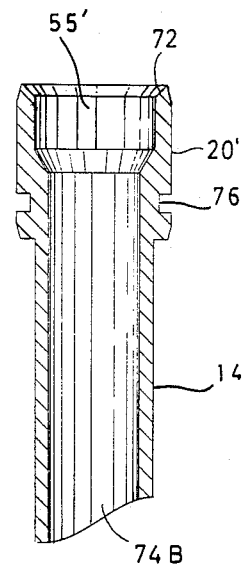
FIG. 4 is a sectional view of typical conduit components to be joined by the present invention.

A separated view of the conduit components for use with the present invention is illustrated in FIG. 4. It may be seen that the extension 53 of the ferrule 16 has an upper terminus at the surface 70. The ferrule 20' has a sloping surface 72 at the open end of the socket 55'. The two surfaces 70, 72 provide for compression use of the sealing element (not shown). When the conduit components 12 and 14 are properly coupled through the use of the ferrules and the coupling device, passageway 74A is joined to passageway 74B whereby fluids may pass therethrough unimpeded. In this embodiment, an annular groove 76 provides for preventing axial movement of ferrule 20' during effecting of a seal.

The operation of the present invention can be best described by reference to the figures, particularly FIG. 1. When a connection between a pair of aligned tubes is to be effected, the ferrule 20 is clamped in the body member 22 using the clamping bar 24. With the swing clamp 34 rotated counter-clockwise from the position shown in FIG. 1, the ferrule 16 is inserted through the bore 32 whereupon the ends of the tubing can be brought into intimate contact. Prior to this assembly, a proper sealing member 66 is applied about the extension 53 of the ferrule 16. Thereafter, the bolt 42 is rotated in a clockwise direction. Since there is frictional engagement between the bolt 42 and the swing clamp 34, as provided by the threaded element 60, rotation in this direction causes the swing clamp 34 to be rotated in a clockwise direction bringing the C-shaped extension 36 thereof into engagement with the tubing 12. Further rotation of the bolt 42, because of the left-handed threads thereof, causes the swing clamp 34 to move axially with respect to the tubing 12 toward the surface 33. When the surface 38 of the swing clamp extension 36 engages the flange shoulder 18, further movement of the swing clamp forces the tubing components together in a sealing arrangement to effect the desired connection and the seal therebetween.

When the tubing components are to be separated for any reason, this is accomplished by a rotation of the bolt 42 in a counter-clockwise direction. Initially, because of the friction between the surfaces 18 and 38, a swing clamp will tend to move axially away from the surface 33 because of the left-handedness of the threads 44. As this axial movement continues, the contact between surfaces 18 and 38 is broken and further rotation of the bolt 42 causes the swing clamp 34 to rotate in a counter-clockwise direction until the limiting pin 52 engages the stud 48. When the swing clamp is in this position, the tubing 12 and its ferrule 16 can be withdrawn from the bore 32 and thereby the entire unit is disconnected.

From the foregoing, it will be understood that the subject connector is operated by one motion, namely the rotation of the screw 42. This is particularly an advantage in systems where remote operation is necessary and/or desirable. For example, in an area where radiation is sufficiently high as to prevent access by a human operator, the bolt 42 can be easily operated by one hand of a remote manipulator. This manipulator may, for example, operate a socket wrench engaged with the bolt 42. The second arm or hand of the manipulator may then be utilized for other purposes as the making or breaking of a joint is accomplished. The system does not require any special surfaces or springs to cause the swing clamp 34 to move into or out of proper engagement as required by systems of the prior art. Furthermore, a single clamping mechanism is utilized in contrast to multiple clamps of several of the systems that have been used in these fields If any corrosion of threads 44 occurs, there is little detrimental effect upon the device. A particular joint may be made and broken a number of time, with a new sealing element being installed only as required.

It is, of course, understood that although a preferred embodiment of the present invention has been illustrated and described, various modifications thereof will become apparent to those skilled in the art. Accordingly, the scope of the invention should be defined only by the appended claims and the equivalents thereof.

We claim:

1. An improved conduit connector of the type utilized to move axially-aligned first and further conduit components into or out of sealing engagement, each of such conduit components having an enlarged ferrule at facing ends thereof, which comprises:
    a body member provided with means to securely hold such enlarged ferrule of such first conduit component against axial and rotational movement, said body being provided with a bore to accept such ferrule of such further conduit component in axial alignment with such first conduit component;
    a swing clamp pivotally mounted on said body member in an orientation for effecting pivoting in a plane substantially perpendicular to the axis of such aligned first and further conduit components, said swing clamp having a substantially C-shaped extension of a size to substantially conform to the exterior surface of such further conduit component, said swing clamp being provided with a bore substantially parallel with the axis of such aligned first and further conduit components at a center of rotation of said swing clamp, said swing clamp bore being provided internally with left-handed threads;
    a pivot bolt provided with exterior left-handed threads to be threadably received within said threaded swing clamp bore, said bolt passing unrestrained through said body member and provided with means to prevent axial movement of said bolt with respect to said body member; and
    friction producing means associated with said threads of said bolt and said swing clamp.

2. The conduit connector of claim 1 further comprising means for limiting rotation of said swing clamp between first and further preselected rotational positions.

3. The conduit connector of claim 2 wherein said means for limiting rotation of said swing clamp comprises a rigid post extending from said body member and limiting pins carried by said swing clamp to engage said post at said preselected rotational positions.

4. The conduit connector of claim 1 wherein said friction producing means comprises an axially moveable element aligned perpendicularly to the axis of said bolt and frictionally engaged with threads of said bolt.

5. Conduit connector of claim 4 wherein said axially moveable element carries external threads and wherein said swing clamp is provided with a further internally threaded bore oriented substantially perpendicular to the axis of said first threaded bore to receive said axially moveable element, and an internally threaded nut threadably received by said axially moveable element to lock said element in said axial position to achieve a preselected amount of friction between said element and said threaded bolt.

6. The conduit connector of claim 1 wherein said means to prevent axial movement of said bolt comprises:
    a shoulder carried by said bolt adjacent to said body member;
    a first thrust washer encircling said bolt and engaging said shoulder and said body member;
    a further thrust washer encircling said bolt bearing against a further surface of said body member;
    an internally threaded nut member carried on said bolt at said further thrust washer; and
    means for locking said nut against rotation.

7. The conduit connector of claim 6 wherein said shoulder is defined by an abrupt transition between a first portion of said bolt threadably engaged with said swing clamp bore and a further portion of said bolt of a reduced diameter, said further portion being provided with external threads for threadable engagement with said nut.

8. The conduit connector of claim 1 wherein said means to securely hold such enlarged ferrule of such first conduit component comprises a recess to accept at least a portion of such enlarged ferrule of such first conduit component and a clamping bar releasably fastened to said body to securely retain such ferrule in said recess.

* * * * *